United States Patent

[11] 3,525,278

| | | | |
|---|---|---|---|
| [72] | Inventor | Charles Sagona |
| | | Brooklyn, N.Y. |
| | | (73 Bay 34th St., New York, N.Y. 10001) |
| [21] | Appl. No. | 788,795 |
| [22] | Filed | Jan. 3, 1969 |
| [45] | Patented | Aug. 25, 1970 |

[54] RECIPROCATING AND ADVANCING ENDLESS BAND SAW, CUTTING BLADE OR THE LIKE
14 Claims, 9 Drawing Figs.

[52] U.S. Cl. .................................................. 83/201.02, 83/201.08, 83/201.14
[51] Int. Cl. .................................................. B26d 1/48, B26d 1/50
[50] Field of Search .......................................... 83/201.02; 143/70-1; 125/16, 21; 51/(Inquired); 83/201.08, 201.14

[56] References Cited
UNITED STATES PATENTS
2,430,160  11/1947  Criner .......................... 125/21X Primary Examiner— James M. Meister
Attorney— M. D. Nissenbaum ABSTRACT: The food to be sliced is slid on a platform against a series of horizontally-spaced, vertical flights of endless cutting band structure supported on shafts, a plurality of which are provided with shaft-encircling clutch devices whose operating members are driven by a powered horizontally reciprocating bar or the like. The resulting cutting band movement is oscillatory as in a jig saw, but the strokes in one direction are longer than the return strokes, thus the band will present a changing cutting region to the food mass. This construction having but a single flight for the actual cutting, can serve as a one-blade slicer or as a jig saw apparatus.

Patented Aug. 25, 1970
3,525,278
Sheet 1 of 2
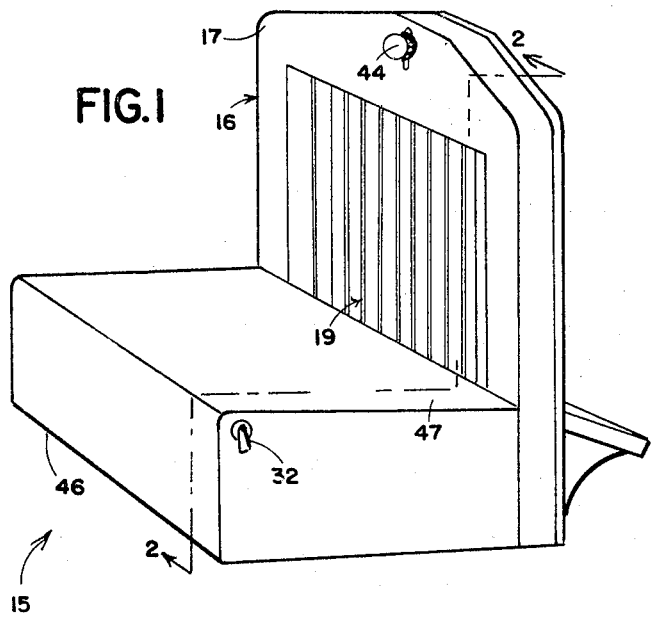
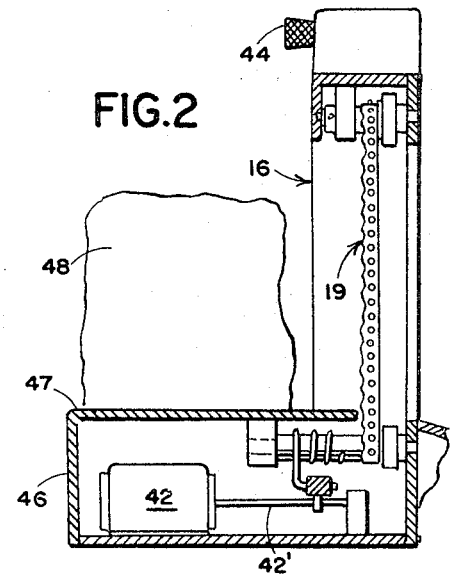
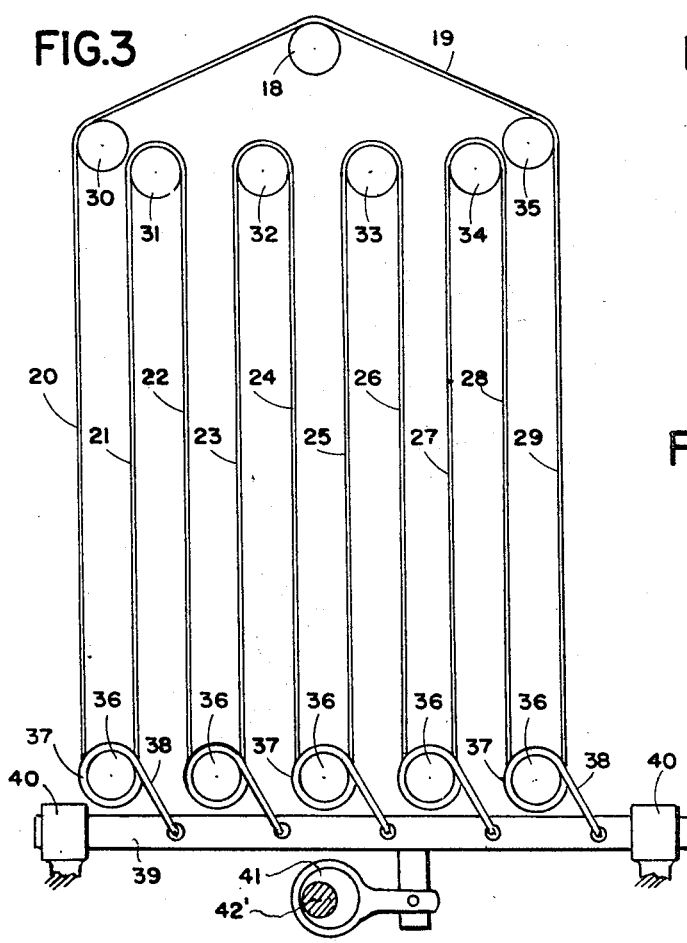
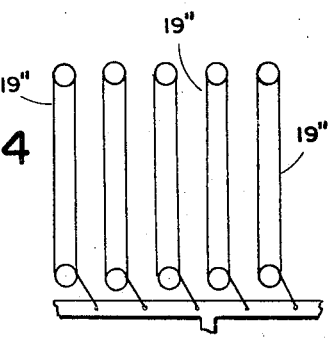
INVENTOR,
Charles Sagona,
BY
ATTORNEY.

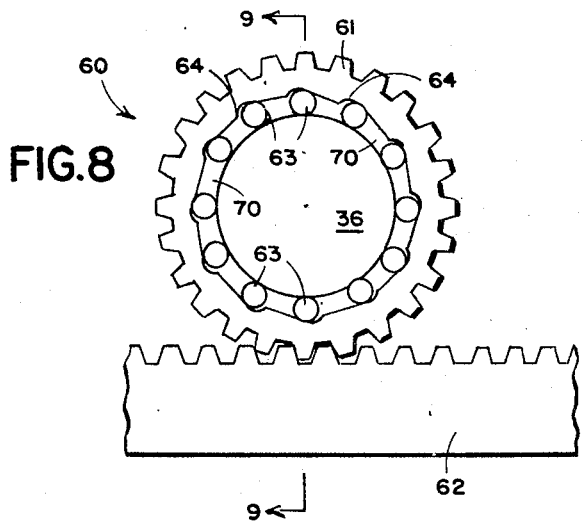
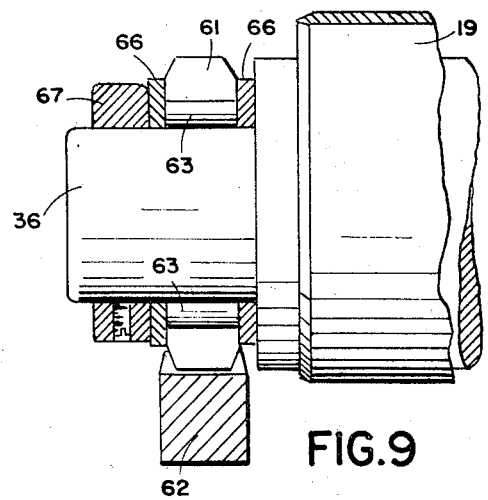
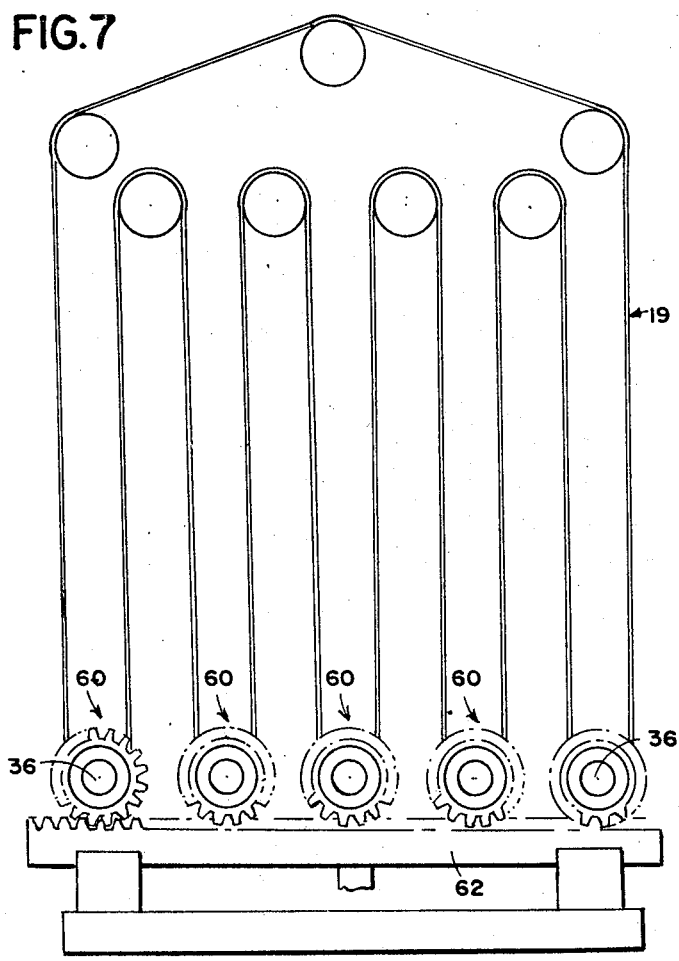

3,525,278

RECIPROCATING AND ADVANCING ENDLESS BAND SAW, CUTTING BLADE OR THE LIKE

The present invention relates to food slicing machines and more particularly to the type whose cutting means comprises driven endless steel band structure, adaptable for use in food packing plants, in prepared food and butcher shops and the like, and for slicing food masses for packaging, as well as for slicing bread and cooked food masses, in industrial plants, restaurants and even in the home where suitable, and for jig saw apparatus.

Heretofore, in slicing machines of the reciprocating blade type, straight cutting knives are fixed on a reciprocatable frame, so the cutting region of the knives never change and only the central part of the knives do the cutting. This method dulls the knives very fast and a substantial length of cutting edge is never in use. The reciprocating blade is especially suitable to cut through the softer food masses such as bread, boneless meat, fish, cooked foods, meat and vegetable loaves, roasts, cheese and the like, without mashing or breaking the food mass apart, which often happens where the cutting blade traveled continuously in one direction accompanied by a steady pressure on the food mass. A soft mass should be cut with short reciprocating strokes, so the food mass is given a chance to rebound to its original form before it is cut again. This keeps the food from breaking and crumbling, holding it in marketable and useable form.

It is therefore the principal object of this invention to provide a food slicing machine of novel and improved construction, utilizing endless cutting belt structure to gain the advantage that the entire cutting edge thereof will be in use during operation of the machine, with the provision that such endless cutting structure shall oscillate along its length and present changing blade sections at the cutting zone, which is also suitable for jig saw construction.

A further object thereof is to provide novel and improved slicing machines of the character described, in which the endless belt cutting structure oscillates along its length with strokes in one direction which are longer than the return strokes, so changing blade sections occupy the cutting zone while the machine is run.

Still a further object thereof is to provide a food slicing machine of the kind set forth, having a novel mode of operation and improved construction, which is reasonable in cost to manufacture, easy to use and efficient in carrying out the purposes for which it is designed.

Other objects and advantages will become apparent as this disclosure proceeds.

In one practice of this invention, there is an upright rectangular frame on whose top rail there is a first horizontal shaft from which hangs a thin steel endless cutting belt whose forward edge is the one that is sharp. Most of said belt is arranged in sinuous form to present equally horizontally spaced, equilength, vertical flights. There are appropriately spaced horizontal shafts supported for rotation on the horizontal rails of said frame, one within each bight of the sinuous formation. The first shaft mentioned, is vertically adjustable so the cutting belt is tensed taut. There may be equi-spaced holes along the entire length of the cutting belt for engagement by spaced pin teeth on at least one shaft, forming sprocket-like formations, so the cutting belt is engaged in the manner of a sprocket chain thereon. Each of the shafts on the lower rail of the frame, carries a coil spring clutch. The operating members of these clutches are connected to a horizontal bar at spaced locations therealong. This bar is mounted for longitudinal reciprocatory movement, which motion is given it by an eccentric cam driven by an electric motor. The frame has a forwardly extending food-supporting platform at a level above the lower shafts; said platform being the top wall of a casing in which the motor is housed. There is also a rearward shelf to support sliced food passing the blade flights. As a modification, I also show a clutch of another type on the shafts mentioned; such different clutches having operating members which are gears, being engaged in a rack taking the place of said bar, as will be explained. As another modification, the cutting means may comprise a series of separate bands. The cutting edge may be straight, waved or have isosceles-shaped teeth, preferably.

In the accompanying drawings forming part of this specification, similar characters of reference indicate corresponding parts in all the views.

FIG. 1 is a perspective view of a slicing machine embodying the teachings of this invention.

FIG. 2 is a section taken at line 2-2 in FIG. 1.

FIG. 3 is an enlarged front view which shows diagrammatically the cutting belt, its shaft mounts on which said belt is supported, and their associated clutch and control means therefor. Most of the framework is omitted to attain clarity of illustration and a quick understanding of the construction.

FIG. 4 is a diagrammatic representation of a machine following the same scheme, in which, instead of using one cutting band, a plurality of separate cutting belts are employed. This view is akin to FIG. 3.

FIG. 5 is a fragmentary view showing a coil spring clutch associated with one of the shafts and linked to the reciprocating bar. Also appearing in this view, is the cutting band or belt having perforations therealong which are engaged by sprocket-like structure on said shaft, and whose cutting edge is a wave-form.

FIG. 6 is a fragmentary face view of a cutting band whose sharpened edge is serrated.

FIG. 7 is a view like FIG. 3 of a modified construction for a slicing machine; the difference being in the type of clutch used. The clutches here shown, are gear driven to open and close their grip on the shafts.

FIG. 8 is an enlarged end view of one of the shafts which carries a clutch, showing the clutch structure and the rack which operates all the clutches. Some parts are omitted, to attain clarity of illustration.

FIG. 9 is a section taken at line 9-9 in FIG. 8.

In the drawings, the numeral 15 designates generally a slicing machine including an upright rectangular frame denoted generally by the numeral 16, on whose top rail as it may be called, and indicated by the numeral 17, there is a first horizontal shaft 18, from which hangs a thin steel endless cutting band or belt 19, whose forward edge 19' is sharp. Most of said belt as shown, is arranged in sinuous form to present equally horizontally spaced, substantially equi-length vertical flights 20—29. There are appropriately spaced horizontal shafts rotatably supported on the horizontal rails of the frame 16, one through each bight of the sinuous formation. The series of shafts on the upper rail comprises those marked 30—35. Each shaft 36 of the lower series, carries a coil spring clutch 37 thereon, the operating member 38 of each of which is a laterally extending end piece of the coil wire, whose distal end is linked to the horizontal bar 39 which is mounted in the slide bearings 40, for reciprocatory movement imparted to it by use of an eccentric cam 41 on the motor shaft 42'. Said reciprocatory motion may be furnished by a double-acting air cylinder or a vibratory solenoid device or other suitable means, all of which is well known in the machine art, and is believed to be understood by those versed in the art, so no illustration thereof need be given. The shaft 18 which is rotatably and slidably mounted, is vertically adjustable in any suitable manner indicated generally by the numeral 44, so the cutting belt is tensed taut. Said belt may have equi-spaced holes 45 along its entire length as in the embodiment illustrated, for engagement by spaced pin teeth on each or selected shafts to form sprocket-like formations so the belt is engaged in the manner of a sprocket chain. The belt, of course, may be frictionally driven without sprocket arrangement. The motor 42 is housed in a casing 46, the upper wall of which serves as a platform 47 for the food mass 48, or suitable carriage means, not shown, but well known in the slicing machine art, may be mounted on said casing, to support and transport the food mass 48 to the cutting zone. All of the coils 37 are wound in the same direction, and are normally in slight frictional contact with the shafts they encircle respectively. The reciprocation of the bar 39 is rapid, and as shown in the illustrated embodiment, is once per motor shaft revolution. This may need be made different, depending on machine size. The extent of bar movement will of course depend on the cam's throw.

To operate, the motor 42 is activated by manipulation of the switch 32 which controls its circuit. This causes the bar 39 to reciprocate. The food mass 48, while pressed down on the platform 47, is slid thereon towards and against the cutting edges presented by the flights of the band 19. A movement of said bar in direction to the left in FIG. 3, will cause the spring coils 37 to tighten on their respective shafts, and evidently when movement is to the right, will cause said coils to loosen. During each tightening stroke, the shafts carrying said coils, will be turned a fraction of a revolution in one direction, because of the one-way drag thereon by the coil turns which are in uni-directional movement to decrease their diameter. Shaft movement will of course cause belt movement. Such belt movement is definite and positive in length. During each loosening stroke, the shafts will be turned in reverse direction a lesser extent by a diminishing drag thereon which occurs, but its extent is haphazard. Since the cutting band, or belt as it may be called, advances more during the tightening stroke than it backs up during the return stroke, the portions of the flights across the frame 16, meaning at the cutting zone, are ever changing during machine operation.

Another form of clutch device denoted herein generally by the numeral 60, may be used in place of each coil spring 37, one around each of the shafts 36, and since each has a gear 61 as its operating member, the oscillating means instead of being the bar 39, is a rack 62 with which all the gears 61 are in mesh, as shown in the modified machine embodiment of FIG. 7. Each of said devices 60 comprises a ring spur gear 61, positioned around a shaft 36. A plurality of steel balls or rollers 63, are spaced around the shaft, in contact therewith and the inner surface of the ring, which is so shaped, that each of said plurality of items has an identical home for travel by rolling movement. At one end of each home, such ends being corresponding ones, each of said items is free to revolve, but is in a slight frictional contact with the associated shaft and gear ring, as shown at 64. The said ring is of course spaced from the shaft. This space offers the homes 70 which diminish in width insufficiently to bar the entrance of an item into an adjacent home. Hence at one position, each item is jammed between the shaft and the ring. Movement of the rack 62, to the right in FIG. 8, is the tightening stroke, during which the positive frictional drag of the items 63 on the shafts will cause said shafts to turn a bit. Movement of the rack 62 to the left, is the loosening stroke, during which there is an haphazard drag of said items on the shaft in the reverse direction, and hence a reverse result, a backward movement of lesser extent in the cutting band. All of this is analogous in action and result, as described for the coils 37.

It is important to note that at the very commencement of the return stroke of the bar 39 or the rack 62, the clutch-encircled shafts are not immediately released, but for a short interval receive some reverse shift, before the shafts become loose again, Hence in the present machine, the occurrence of such reverse movement which ordinarily would be unwanted and a fault in a clutch device, becomes a benefit. The endless band cutting structure moves longitudinally while it oscillates in jig saw fashion.

It is evident that the machine's cutting band structure instead of being a single endless belt 19, may comprise a plurality of individual endless belts 19'', each arranged on its own shafts as shown in FIG. 4, and equipped with either of the shaft-encircling friction clutch devices herein set forth and driving means therefor.

Cutting edges may be straight as shown in FIG. 1, waved as at 19' in FIG. 5, or serrated with preferably isosceles-shaped teeth 59 shown in FIG. 6. The direction of the flights may be vertical as illustrated, or at an angle to vertical as is well known in this art. In any such event, the food-supporting surface 49 may be horizontal, or in acute-angled relation to cutting flight direction to effect gravity feed, as is well known.

A collar 50 is fixed on each shaft as a limit and backing support for the back edge of the cutting band thereon to bear against. The numeral 51 denotes a thrust bearing on each shaft. In FIG. 9, the numerals 66 denote flat rings, and 67 indicates a collar fixed on the shaft, to maintain the assembly, as one example of construction.

It is believed that those versed in the machine art can readily understand without the necessity of further illustration, that an embodiment having a single endless band as 19'' whose cutting edge is serrated as 59, and employing a frictional shaft-encircling clutch means and the oscillating mover therefor, would constitute a jig saw apparatus, in which only one flight would be presented to work on material to be cut; the other flight being cased in framework, and which would have the feature of an ever-changing blade section at the cutting zone, as described herein.

This invention is capable of numerous forms and various applications without departing from the essential features herein disclosed. It is therefore intended and desired that the embodiments herein set forth shall be deemed merely illustrative and not restrictive and that reference shall be had to the following claims rather than to the specific showing and description herein, to indicate the scope of this invention.

I claim:

1. In a machine of the character described, in combination, a frame having an opening, a taut endless cutting band presenting a flight across said opening, shafts rotatably mounted on the frame, supporting said band, a friction clutch mechanism associated with one of said shafts, comprising structure encircling the associated shaft and presenting an operating member; part of said encircling structure being normally in slight frictional contact with such shaft, means to reciprocate said operating member whereupon movement thereof in one direction, said part will grip and cause such shaft to turn a predetermined portion of a revolution in one direction, and upon movement thereof in the opposite direction, said part will continue its grip and cause the shaft to turn in reverse direction a lesser portion of a revolution before the shaft is loose and subject only to said slight friction, whereby the band will reciprocate along its length while it intermittently moves along its length, thus changing the cutting edge presented across said opening.

2. A machine as defined in claim 1, wherein each encircling structure comprises a coil spring; an extension from one end of said coil constituting its operating member, and wherein said part constitutes the inner surface of the coil.

3. A machine as defined in claim 1, wherein the encircling structure comprises a ring spaced from the associated shaft; an extension from said ring constituting its operating member, and said part constitutes a plurality of revolvable items, each movable in said space between two spaced positions respectively; each of said items being in slight frictional contact with said ring and shaft at one of said positions, and jammed between said ring and shaft at the other of said positions.

4. In a slicing machine of the character described, in combination, a frame having an opening, taut endless cutting band structure in an arrangement presenting more than two spaced parallel flights across said opening, parallel shafts rotatably mounted on the frame, supporting said band structure in said arrangement, friction clutch mechanisms associated with a plurality of said shafts respectively; each such mechanism comprising structure encircling the associated shaft and presenting an operating member; part of said structure being normally in slight frictional contact with such shaft; means to reciprocate said operating members whereupon movement thereof in one direction, the said part will grip and cause such shaft to turn a predetermined portion of a revolution in one direction, and upon movement thereof in the opposite direction, said part will continue its grip and cause the shaft to turn in reverse direction a lesser portion of a revolution before the shaft is loose and subject only to said slight friction, whereby the band structure will reciprocate along its length while it intermittently moves along its length, thus changing the cutting edges presented across said opening.

5. A slicing machine as defined in claim 4, wherein the endless cutting band structure comprises a single endless belt.

6. A slicing machine as defined in claim 4, wherein the endless cutting band structure comprises a plurality of endless belts.

7. A slicing machine as defined in claim 4, wherein the endless band structure has equi-spaced openings along its entire length and at least one shaft has a sprocket-like structure engaging said band structure.

8. A slicing machine as defined in claim 4, wherein the flights are equi-spaced.

9. A slicing machine as defined in claim 4, including a support across said opening and extending forwardly of said flights, for carrying a food mass to be advanced for cutting action by said flights thereon.

10. A slicing machine as defined in claim 4, including means to adjust the tension in the cutting band structure.

11. A slicing machine as defined in claim 4, wherein each encircling structure comprises a coil spring; an extension from one end of said coil, constituting its operating member, and wherein said part constitutes the inner surface of the coil.

12. A slicing machine as defined in claim 11, wherein the shafts carrying the coils are adjacent each other, and wherein the means to reciprocate the operating members comprises a bar extending in a direction across said shafts and mounted for longitudinal sliding movement on the frame, and powered means to reciprocate said bar; said operating members being linked to said bar for movement therewith.

13. A slicing machine as defined in claim 4, wherein each encircling structure comprises a ring spaced from the associated shaft; an extension from said ring constituting its operating member, and said part constitutes a plurality of rollable items, each rollable in said space between two spaced positions respectively; each said item being in slight frictional contact with said ring and shaft at one of said positions, and jammed between said ring and shaft at the other of said positions.

14. A slicing machine as defined in claim 13, wherein the shafts carrying the rings are adjacent each other and wherein the means to reciprocate the operating members, comprise a rack extending in a direction across said shafts and mounted for longitudinal sliding movement on the frame, and powered means to reciprocate said rack; each of said operating members constituting gear teeth in meshed relation with said rack.